Dec. 5, 1961  R. LUNDQVIST ET AL  3,012,083
ELECTRIC STIRRING WINDINGS
Filed Feb. 26, 1959

INVENTORS
Ragnar Lundqvist and
Tord Fredriksson.
BY
Attorney.

United States Patent Office 3,012,083
Patented Dec. 5, 1961

3,012,083
ELECTRIC STIRRING WINDINGS
Ragnar Lundqvist and Tord Fredriksson, Vasteras, Sweden, assignors to Allmanna Svenska Elektriska Aktiebolaget, Vasteras, Sweden, a corporation of Sweden
Filed Feb. 26, 1959, Ser. No. 795,705
4 Claims. (Cl. 13—26)

Under some circumstances electric stirring windings (of the pancake type as well as the cylindric type) for furnaces, have to deliver full stirring power to the molten metal for only short periods, while only a considerably reduced stirring power is required during the greater part of the time they are in use.

If there are two stirring windings for two furnaces in a plant it is conceivable to try to use one common motor converter which is dimensioned for the maximum stirring power required for one stirring winding in order to bring about said lower stirring power simultaneously in both windings.

However, if the two stirring windings are to be connected in parallel or in series it has been proved that only half the rated power can be taken from the converter in order to avoid overloading it with respect to current or voltage. Thereby, the input power fed to each of the stirring windings is only a quarter of the maximum power with the result that the stirring power is also decreased to a quarter of the maximum stirring power.

The present invention relates to methods and means which enable a motor converter common for two stirring windings and dimensioned for full stirring power, only in one stirring winding, to simultaneously feed the two stirring windings without decreasing the stirring power to less than approximately half the maximum power.

The method according to the invention is characterised in that each of the stirring windings is fed simultaneously during a desired period, with half the rated power from one multiple phase generator and in that the stirring windings are fed one by one during the other desired periods, with the full rated power.

Figure 1:
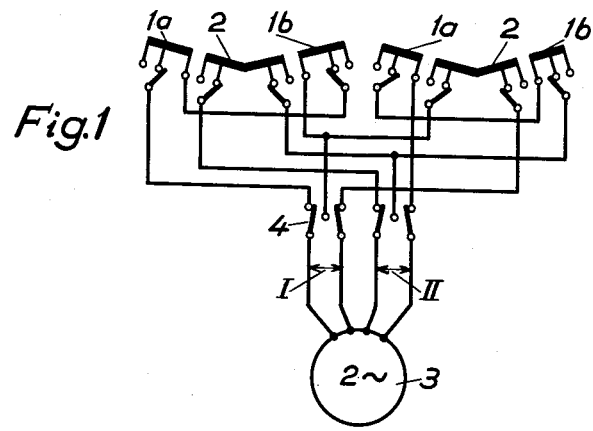
Figure 2:
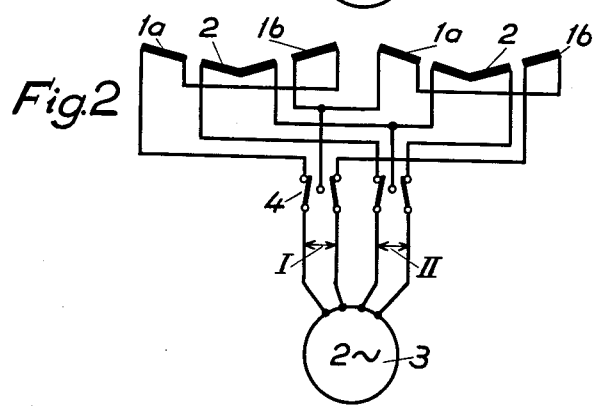
Figure 3:
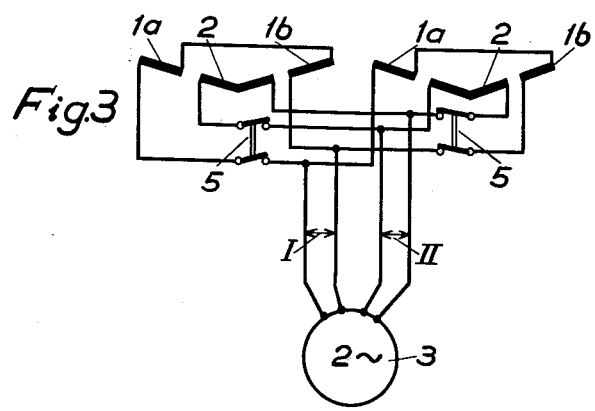

This method may be performed according to the invention in different ways which are illustrated in the accompanying drawing, wherein, FIGURES 1, 2 and 3 show wiring diagrams for three alternative proposals exemplified on two stirring windings of the cylindric coil type. It is evident that the wiring diagrams may also be employed for windings of the pancake coil type.

In all the figures two stirring systems are shown, each consisting, for the sake of simplicity, of two coils 1a, 1b and 2 fed symmetrically by two-phase current. The current source is indicated by a two-phase low frequency generator 3.

According to FIGURE 1 the coils are provided with additional taps. Due to this arrangement a number of winding turns can be shunted so that the voltage required for passing normal current (rated current) through at normal frequency (rated frequency) becomes half the normal voltage (rated voltage). The two stirring systems are connected in series and to the generator 3. Each of the stirring windings thus receive half the maximum power and leave half the maximum power while the generator is loaded with its rated power. If only one of the stirring windings have to operate, the switches 4 are operated. In the wiring diagram shown, the coils 1a, 1b of one system are series-connected with the coil 2 of the other system and fed from phase I, and the coil 2 of the former system is series-connected with the coils 1a, 1b of the other system and fed from phase II. Thereby the inequality of the phase voltage can be compensated, which may occur due to the shunting of winding turns.

In the modified arrangement according to FIGURE 2, the two stirring systems are again series connected and the voltage drop in each stirring winding is reduced to half the normal voltage (rated voltage) at normal current, by reducing the frequency in any known way, for instance, by turning the turnable brush bridges of a Schragemotor which delivers low frequency two-phase current for the excitation of the two-phase generator. By decreasing the frequency the reactance of each stirring winding is decreased in the same degree so that the voltage drop across the stirring winding is reduced and consequently also the power which each of the stirring windings requires when operating simultaneously. The load of the generator 3 remains equal to its rated output while each of the stirring windings receives half the maximum power. If the normal frequency is properly chosen the stirring power will be half the normal power.

Finally, FIGURE 3 shows an alternative in which both the stirring systems are connected in parallel during the period in which only reduced stirring power is required in each system. Each stirring system is thus fed by half the rated current, at the same time the frequency is increased in any known way beyond the normal frequency employed when only one stirring system is fed, so that the greatest possible stirring power is obtained by using half the rated current, but it is only increased so much that the voltage required is equal to the voltage of the generator and the rated voltage of the stirring winding respectively.

If the frequency was not increased the stirring power would be quarter of the normal stirring power or somewhat more, due to the fact that half the rated current is used, if the iron core of the stirring winding is more or less saturated at rated load. By increasing the frequency the stirring power is considerably increased beyond this value, i.e. in the most favourable case (depending on the choice of the rated frequency) to approximately half the normal stirring power. The switching over from simultaneous operation of both stirring systems to single operation of one of them, can be performed by the breakers 5.

We claim as our invention:

1. A method of operating two polyphase stirring windings, each arranged adjacent to a furnace, from one polyphase generator dimensioned for delivering full stirring power to only one stirring winding, characterised in that during a desired period the two stirring windings are fed simultaneously with half the rated power, and during another desired period each stirring winding is fed, one by one, with full rated power.

2. Apparatus for operating two polyphase stirring windings adjacent to a furnace simultaneously with half the rated power, comprising means connecting the two stirring windings in series, taps on the coils of said windings, said taps being so positioned as to shunt such a number of winding turns that the phase voltage required for passing the rated current through the coils is approximately half the rated voltage for each stirring winding, while the frequency is kept equal to the rated frequency.

3. Method as claimed in claim 1 characterised in that the stirring windings are connected in series, and the phase voltage of each stirring winding is decreased to half the rated voltage by reducing the rated frequency to at least half the rated frequency while the current is kept equal to the rated current.

4. Method as claimed in claim 1 characterised in that the stirring windings are connected in parallel and the rated frequency is increased so much that each stirring winding receives full rated voltage while the current is reduced to half the rated current.

References Cited in the file of this patent

UNITED STATES PATENTS

| | | |
|---|---|---|
| Re. 24,462 | Dreyfus | Apr. 22, 1958 |
| 1,851,984 | Rennerfelt | June 21, 1927 |
| 2,774,803 | Dreyfus | Dec. 18, 1956 |
| 2,852,586 | Steele | Sept. 16, 1958 |
| 2,875,261 | Hanff | Feb. 24, 1959 |